United States Patent
Mizunuma et al.

(10) Patent No.: US 9,810,946 B2
(45) Date of Patent: Nov. 7, 2017

(54) DISPLAY DEVICE

(71) Applicant: Japan Display Inc., Minato-ku (JP)

(72) Inventors: Tatsuro Mizunuma, Tokyo (JP); Shigesumi Araki, Tokyo (JP); Hirohisa Miki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 129 days.

(21) Appl. No.: 14/992,185

(22) Filed: Jan. 11, 2016

(65) Prior Publication Data

US 2016/0223863 A1 Aug. 4, 2016

(30) Foreign Application Priority Data

Jan. 30, 2015 (JP) ................................. 2015-017202

(51) Int. Cl.
*G02F 1/1335* (2006.01)
*G02F 1/1333* (2006.01)

(52) U.S. Cl.
CPC .. *G02F 1/133617* (2013.01); *G02F 1/133345* (2013.01); *G02F 1/133553* (2013.01); *G02F 2001/133565* (2013.01)

(58) Field of Classification Search
CPC ... G02F 1/133345; G02F 2001/133565; G02F 1/133617; G02F 1/133553; G02F 1/133602; G02F 2001/133614
See application file for complete search history.

(56) References Cited

U.S. PATENT DOCUMENTS

| | | | |
|---|---|---|---|
| 2009/0115713 A1 | 5/2009 | Kakinuma et al. | |
| 2013/0341588 A1* | 12/2013 | Jeon | G02F 1/174 257/13 |
| 2014/0016296 A1* | 1/2014 | Jeon | G02F 2/02 362/19 |
| 2015/0009440 A1* | 1/2015 | Lee | G02F 2/02 349/42 |
| 2015/0146452 A1* | 5/2015 | Kim | F21V 9/14 362/611 |
| 2015/0346548 A1* | 12/2015 | Kubota | G02F 1/133371 349/113 |
| 2016/0026040 A1* | 1/2016 | Qiu | G02B 6/005 349/65 |
| 2016/0070136 A1* | 3/2016 | Jang | G02F 1/133514 349/61 |
| 2016/0195775 A1* | 7/2016 | Lee | G02F 1/1368 349/43 |

(Continued)

FOREIGN PATENT DOCUMENTS

JP 2009-134275 6/2009
JP 2013-254071 12/2013

*Primary Examiner* — Jia Pan
(74) *Attorney, Agent, or Firm* — Oblon, McClelland, Maier & Neustadt, L.L.P.

(57) ABSTRACT

According to one embodiment, a display device includes a first insulating substrate, a second insulating substrate, a first pixel electrode and a second pixel electrode, a wavelength conversion element to convert light of a first wavelength polarized in a first polarization direction into light of a second wavelength polarized in a second polarization direction, and a liquid crystal layer having a first thickness in an area opposed to the first pixel electrode, and having a second thickness greater than the first thickness in an area opposed to the second pixel electrode.

19 Claims, 9 Drawing Sheets

(56) References Cited

U.S. PATENT DOCUMENTS

| | | | |
|---|---|---|---|
| 2016/0209706 A1* | 7/2016 | Miki | G02F 1/133617 |
| 2016/0216545 A1* | 7/2016 | Lee | G02F 1/133377 |
| 2016/0252658 A1* | 9/2016 | Kuo | G02B 1/14 |
| | | | 359/487.01 |
| 2016/0320664 A1* | 11/2016 | Kang | G02F 1/133528 |

* cited by examiner

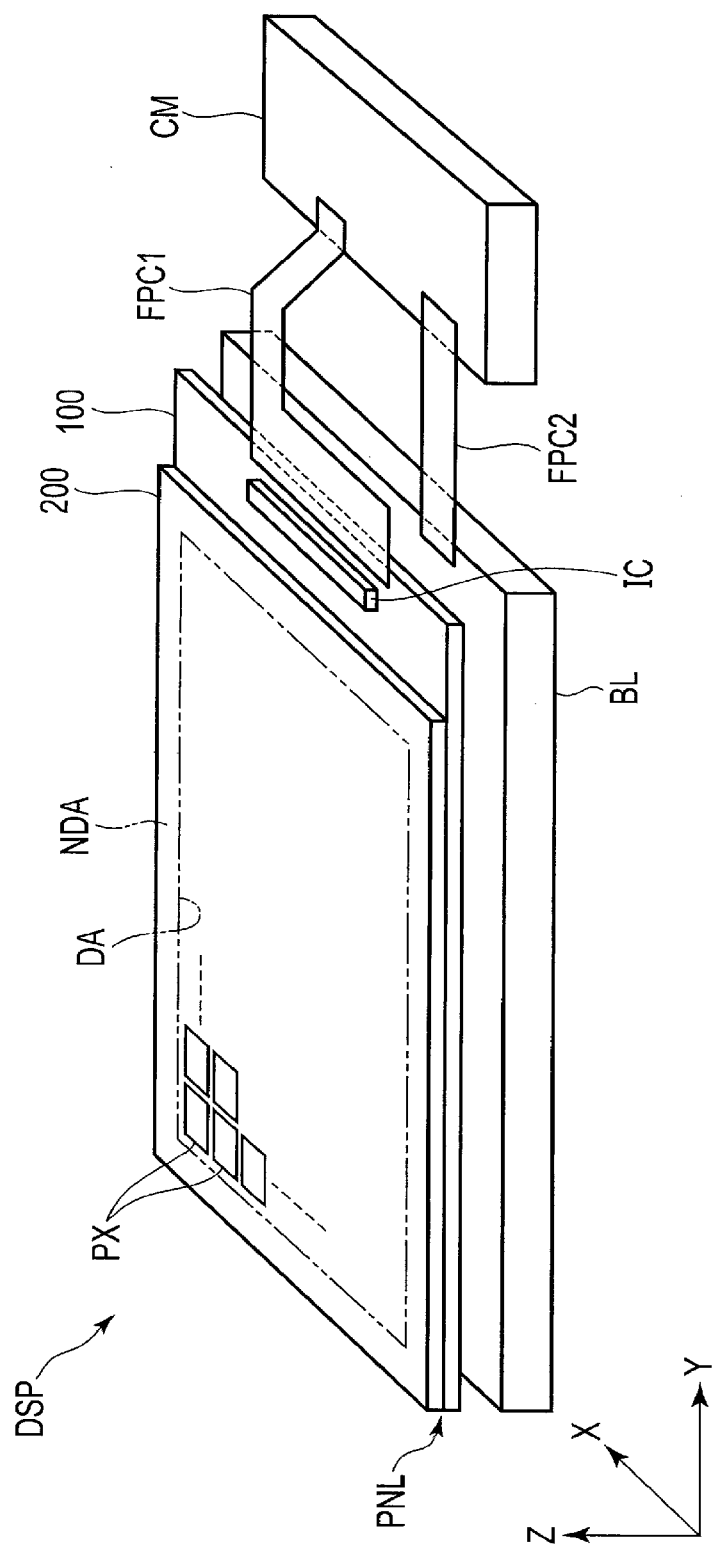
F I G. 1

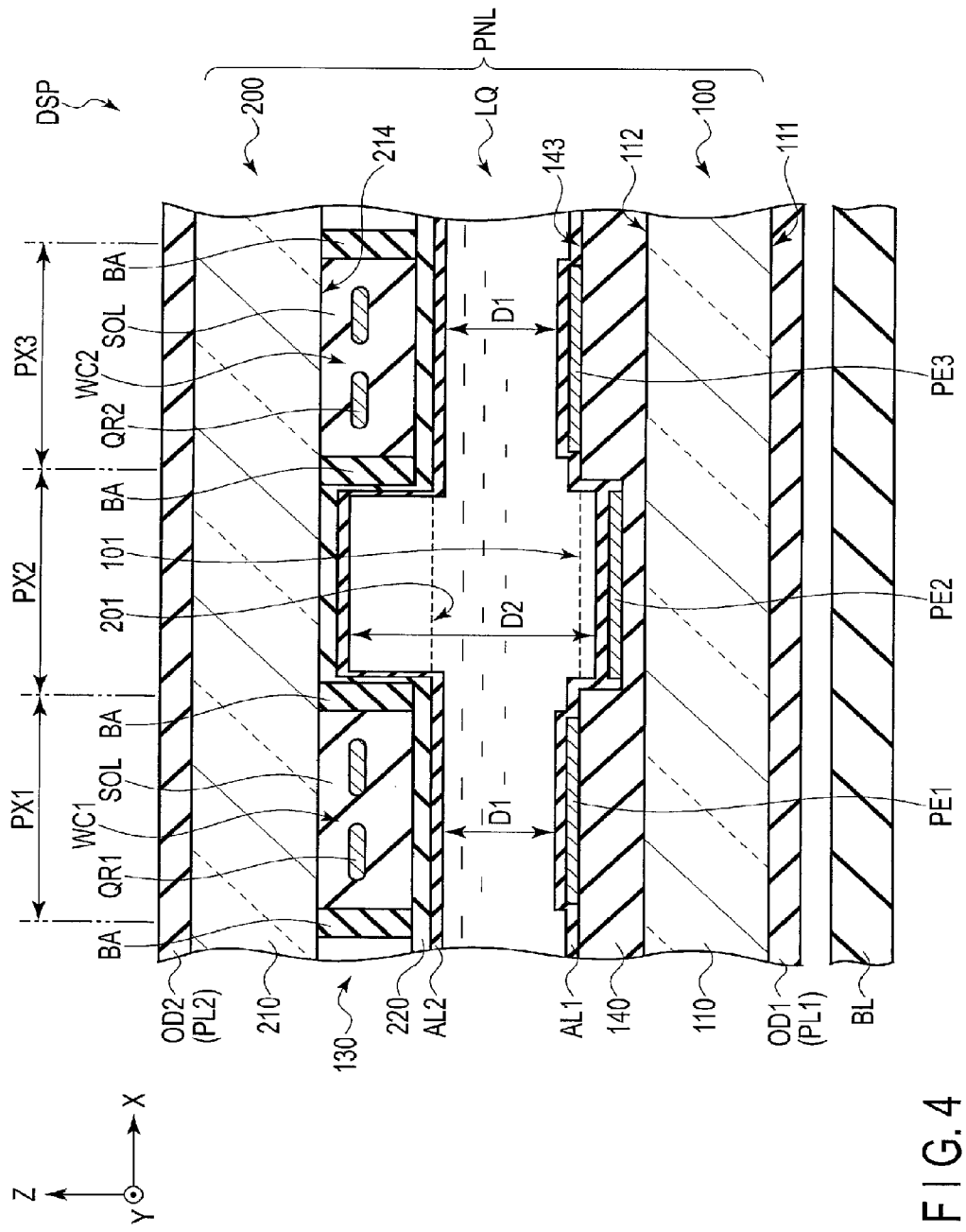
F I G. 4

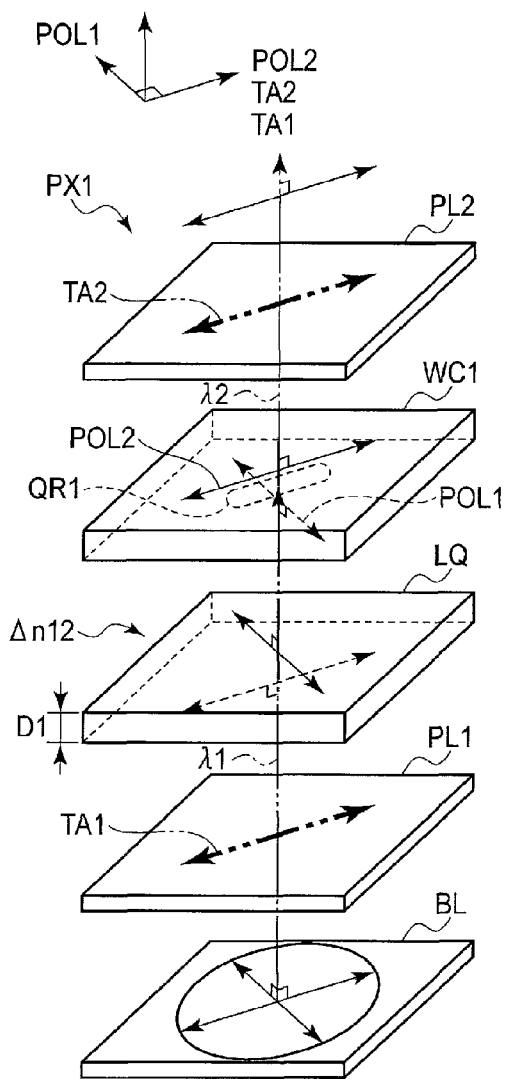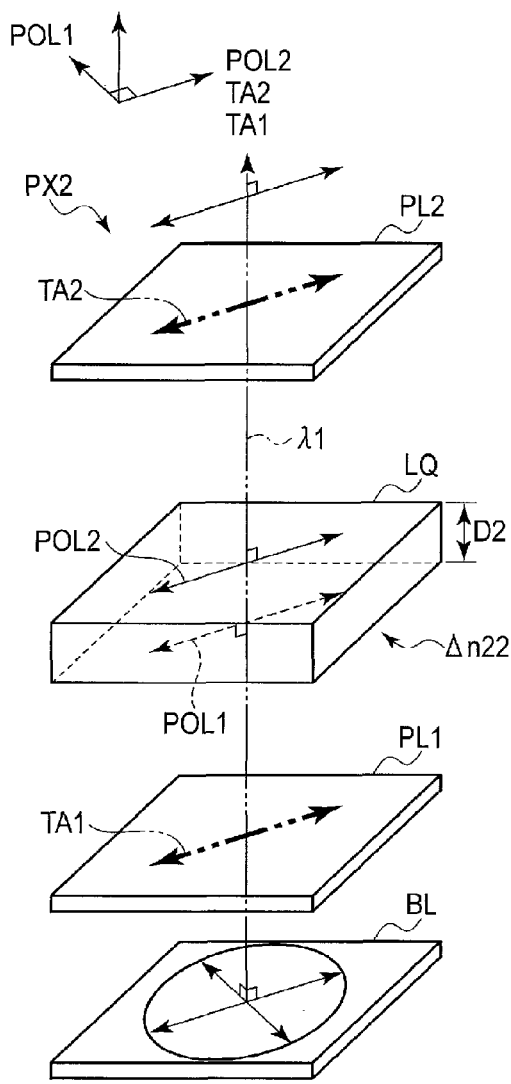
F I G. 7A    F I G. 7B

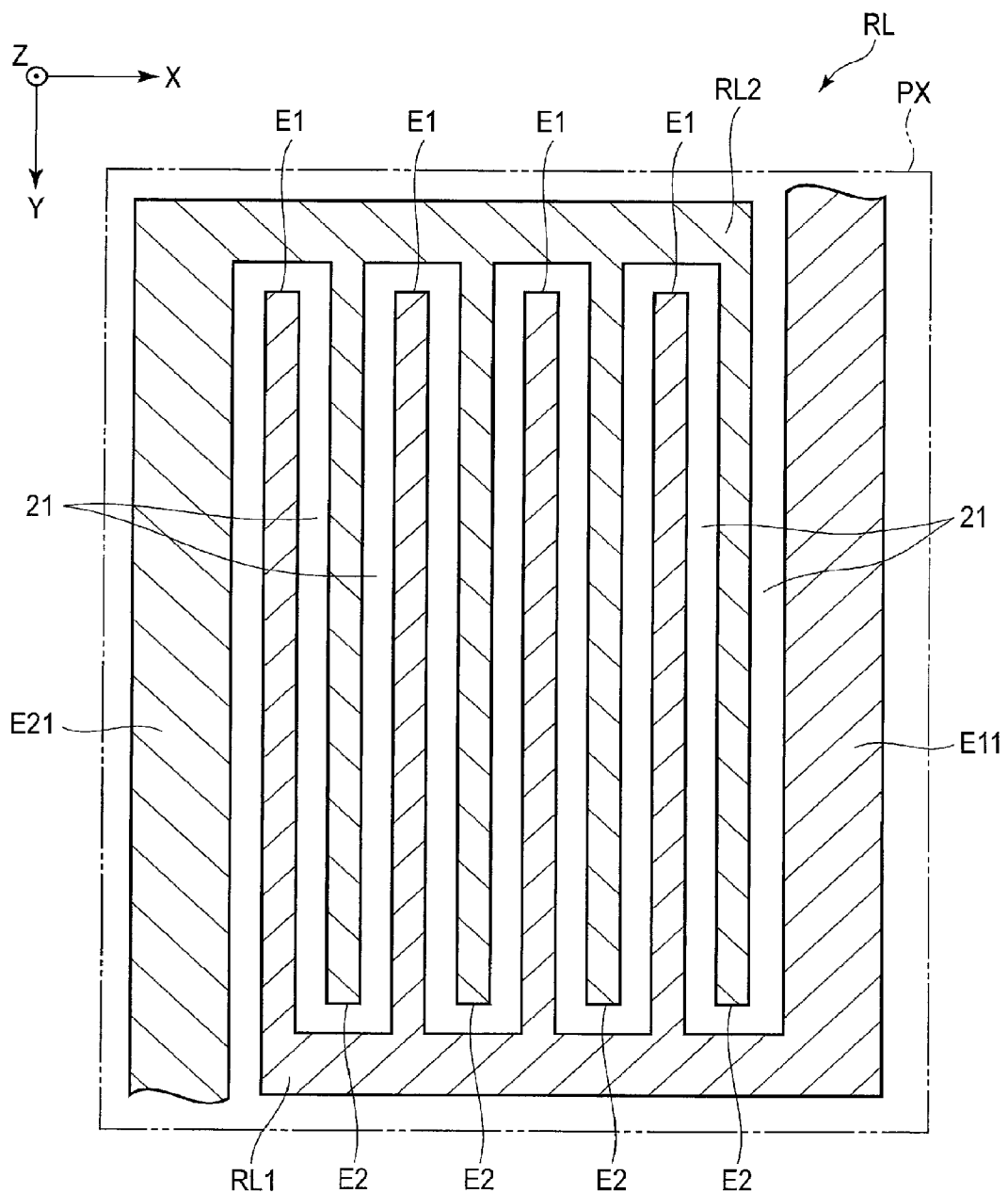
F I G. 9

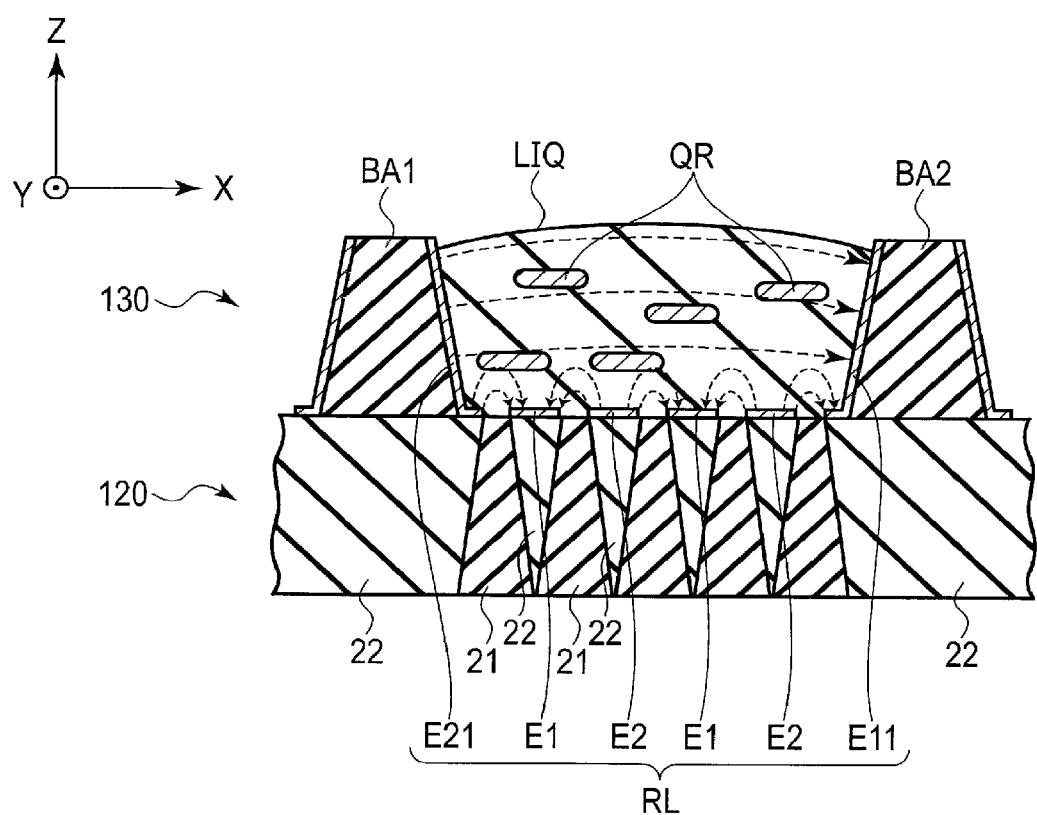
F I G. 10

DISPLAY DEVICE

CROSS-REFERENCE TO RELATED APPLICATIONS

This application is based upon and claims the benefit of priority from Japanese Patent Application No. 2015-017202, filed Jan. 30, 2015, the entire contents of which are incorporated herein by reference.

FIELD

Embodiments described herein relate generally to a display device.

BACKGROUND

As an example of display devices, a display device in which a backlight unit of a white light source and a liquid crystal display panel comprising a primary-colors filter are combined is well known. Since the color filter permits a specific wavelength range to pass therethrough and cuts the other wavelength ranges, the efficiency of the light emitted from the backlight unit is deteriorated by the cut wavelength ranges in the display device.

In contrast, a display device in which a backlight unit of a single-color light source and a liquid crystal display panel comprising a wavelength conversion element are combined has been disclosed. In a quantum dot of a semiconductor, for example, light-emission properties such as a polarization direction and a peak wavelength can be varied by controlling its shape and size. For this reason, application of such a quantum dot to a wavelength conversion element has been expected.

BRIEF DESCRIPTION OF THE DRAWINGS

FIG. 1 is a perspective view schematically showing a display device of one of the present embodiments.

FIG. 4 is a view showing a cross-section of the display device comprising the wavelength conversion layer in the second substrate.

FIG. 7A is an illustration schematically showing a polarization direction of the light passing through the display device, in white display.

FIG. 7B is an illustration schematically showing a polarization direction of the light passing through the display device, in white display.

FIG. 9 is an illustration showing a structure of the reflective layer.

FIG. 10 is a view showing a method of forming a wavelength conversion element.

DETAILED DESCRIPTION

Figure 2:
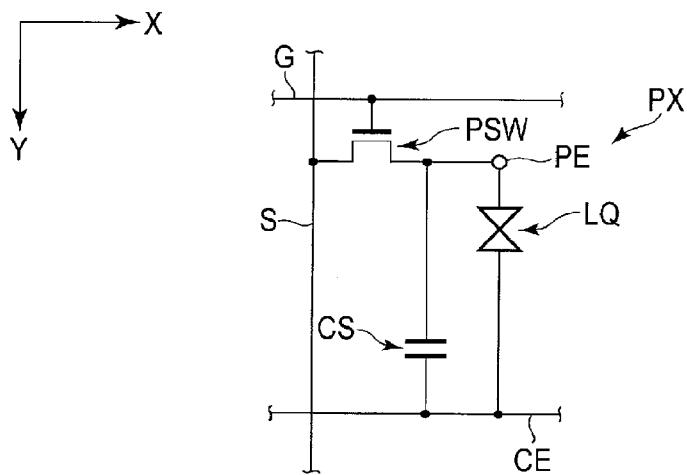
FIG. 2 is an illustration showing a pixel configuration.

In general, according to one embodiment, a display device comprises a first insulating substrate, a second insulating substrate opposed to the first insulating substrate, a first pixel electrode and a second pixel electrode arranged between the first insulating substrate and the second insulating substrate, a wavelength conversion element located between the first pixel electrode and the first insulating substrate or between the first pixel electrode and the second insulating substrate, to convert light of a first wavelength polarized in a first polarization direction into light of a second wavelength polarized in a second polarization direction, and a liquid crystal layer located between the first insulating substrate and the second insulating substrate, having a first thickness in an area opposed to the first pixel electrode, and having a second thickness greater than the first thickness in an area opposed to the second pixel electrode.

According to another embodiment, a display device comprises a first substrate, a second substrate opposed to the first substrate, and a liquid crystal layer arranged between the first substrate and the second substrate, and the first substrate comprises an insulating substrate comprising a first main surface and a second main surface opposed to the first main surface, a polarizer arranged on the first main surface, a wavelength conversion element arranged on a side of the insulating substrate opposed to the second main surface, an interlayer insulating film arranged at a position opposed to the wavelength conversion element, and including a first recess portion at a position different from the position opposed to the wavelength conversion element, a first pixel electrode arranged between the interlayer insulating film and the liquid crystal layer, and opposed to the wavelength conversion element, and a second pixel electrode arranged between the interlayer insulating film and the liquid crystal layer, and located at the first recess portion, and the liquid crystal layer has a first thickness in an area opposed to the first pixel electrode and a second thickness greater than the first thickness in an area opposed to the second pixel electrode.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape, and the like, of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

FIG. 1 is a perspective view schematically showing a display device of one of the present embodiments.

The display device comprises a liquid crystal display panel in the present embodiment, but the display device may comprise a spontaneous light-emitting display panel of organic electroluminecence or the like, an electronic-paper type display panel comprising a cataphoretic element, or the like, as the display panel.

A liquid crystal display device DSP comprises a display panel PNL, a driving IC chip IC which drives the display panel PNL, an illumination device which illuminates the display panel PNL, a control module CM, flexible circuit boards FPC1 and FPC2, and the like. In the present embodiment, a first direction X is, for example, a short-side direction of the display panel PNL. A second direction Y is a direction which intersects the first direction X and also a long-side direction of the display panel PNL. In addition, a third direction Z is a direction which intersects the first direction X and the second direction Y.

The display panel PNL comprises a first substrate 100, a second substrate 200 arranged to be opposed to the first substrate 100, and a liquid crystal layer (a liquid crystal layer LQ to be described later) held between the first substrate 100 and the second substrate 200. The display panel PNL includes a display area DA on which an image is displayed, and a frame-shaped non-display area NDA located around the display area DA. The display panel PNL comprises pixels PX arrayed in a matrix in the first direction X and the second direction Y, in the display area DA.

The backlight unit BL which is an example of the illumination device is disposed on a back surface side of the display panel PNL. Various types of units are applicable as the backlight unit BL, but explanation of the detailed structure of the backlight unit BL is omitted.

The driving IC chip IC is mounted on the first substrate 100 of the display panel PNL. The flexible circuit board FPC1 is mounted on the first substrate 100 and makes connection between the display panel PNL and the control module CM. The flexible circuit board FPC2 makes connection between the backlight unit BL and the control module CM.

The display device DSP of such a configuration corresponds to what is called a transmissive type liquid crystal display device comprising a transmission display function of displaying an image by selectively transmitting the light incident on the display panel PNL from the backlight unit BL, by each of the pixels PX. However, the display device DSP may be what is called a reflective type liquid crystal display device comprising a reflective display function of displaying an image by selectively reflecting the external light incident on the display panel PNL from the outside, by each of the pixels PX, or a transreflective type liquid crystal display device comprising functions of both the transmissive and reflective type liquid crystal display devices. In the reflective type liquid crystal display device, a front light unit may be arranged on a front surface side or display surface side of the display panel PNL as an illumination device. A transmissive type liquid crystal display device will be hereinafter explained as an example of the liquid crystal display device.

FIG. 2 is an illustration showing a pixel configuration.

Each pixel PX comprises a switching element PSW, a pixel electrode PE, a common electrode CE, a liquid crystal layer LQ and the like. The switching element PSW is formed of, for example, a thin film transistor (TFT). The switching element PSW is electrically connected to a gate line G and a source line S. The gate line G extends in, for example, the first direction X. The signal line S extends in, for example, the second direction Y. It should be noted that the gate line G and the signal line S may be formed linearly or at least one of them may be bent or curved.

The pixel electrode PE is electrically connected to the switching element PSW. The pixel electrode PE is opposed to the common electrode CE, and drives the liquid crystal layer LQ by an electric field formed between the pixel electrode PE and the common electrode CE. A storage capacitor CS is formed, for example, between the common electrode CE and the pixel electrode PE.

Figure 3:
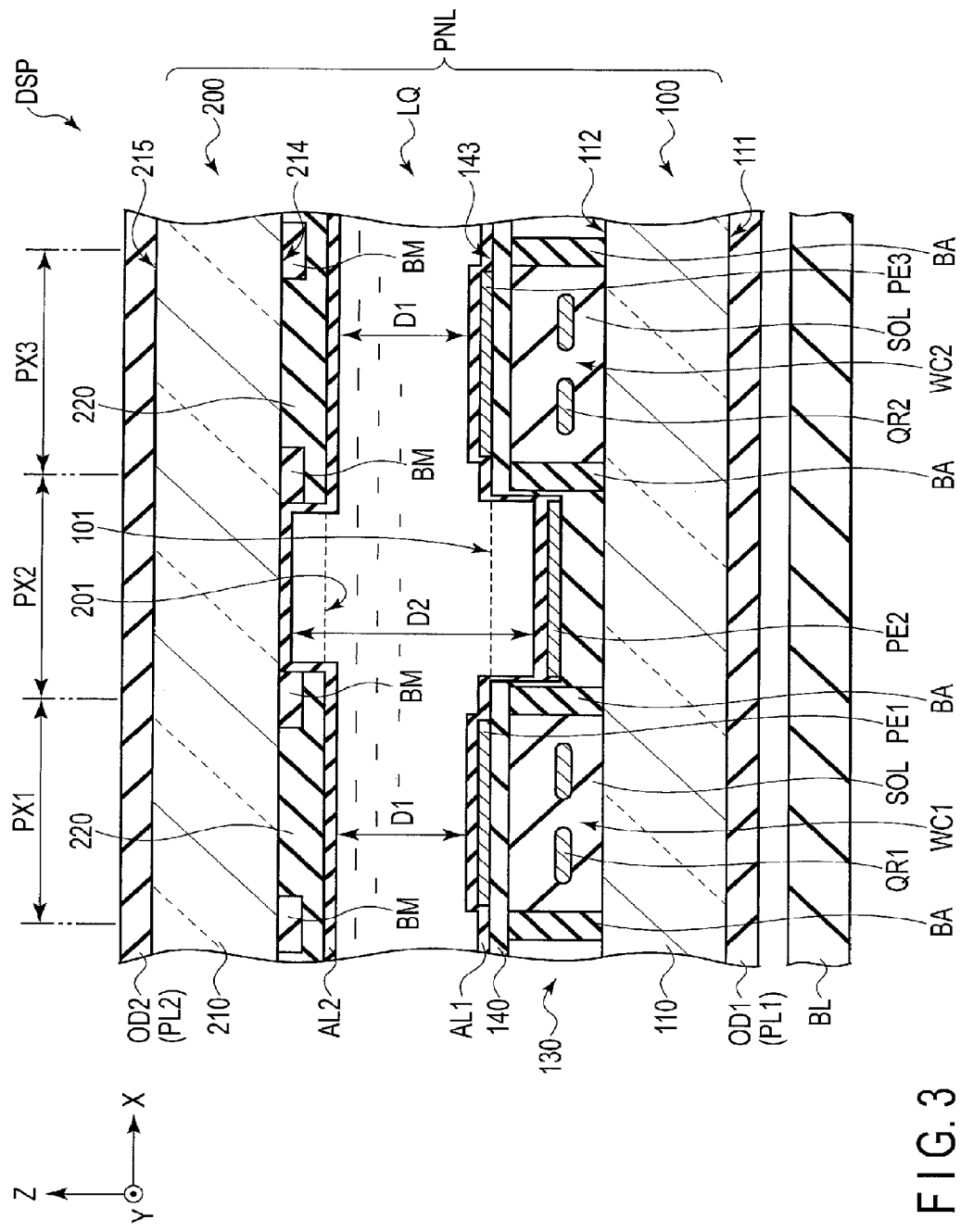
FIG. 3 is a view showing a cross-section of the display device comprising a wavelength conversion layer in the first substrate.

FIG. 3 is a view showing a cross-section of the display device comprising a wavelength conversion layer in the first substrate.

The display device DSP comprises the display panel PNL, the backlight unit BL, a first optical element OD1, and a second optical element OD2. The illustrated display panel PNL may be configured to correspond to a display mode using a lateral electric field which is parallel chiefly to the main substrate surface or a display mode using a longitudinal electric field perpendicular to the main surface of the substrate, an oblique electric field inclined to the main substrate surface or a combination thereof. In the display mode using the lateral electric field, for example, a configuration in which the first substrate 100 comprises the common electrode CE besides pixel electrode PE can be applied. In the display mode using the longitudinal electric field or the oblique electric field, for example, a configuration in which the first substrate is provided with the pixel electrode PE and the second substrate 200 is provided with the common electrode CE can be applied. The main substrate surface indicates a surface parallel to an X-Y plane defined by the first direction X and the second direction Y which are perpendicular to each other. The common electrode CE is not illustrated in FIG. 3.

The display panel PNL comprises the first substrate 100, the second substrate 200 and the liquid crystal layer LQ. The first substrate 100 and the second substrate 200 are bonded to each other with a predetermined gap formed therebetween. The liquid crystal layer LQ is held between the first substrate 100 and the second substrate 200.

The first substrate 100 comprises a first insulating substrate 110, a wavelength conversion layer 130, an interlayer insulation film 140, a first pixel electrode PE1, a second pixel electrode PE2, a third pixel electrode PE3, and a first alignment film AL1. It should be noted that the switching elements, gate lines, signal lines and various insulating films are not illustrated. In contrast, the second substrate 200 comprises a second insulating substrate 210, a light-shielding layer BM, an overcoat layer 220, and a second alignment film AL2. The display device DSP may further comprise a color filter. A color filter may be arranged in the second substrate 200 or the first substrate 100.

The first insulating substrate 110 is formed of an insulating material having a light transmissivity such as a glass substrate or a resin substrate. The first insulating substrate 110 includes a first main surface 111 opposed to the backlight unit BL and a second main surface 112 arranged on a side opposite to the first main surface. The wavelength conversion layer 130 is arranged on a side opposed to the liquid crystal layer LQ of the first insulating substrate 110, i.e., a side opposed to the second main surface 112 of the first insulating substrate 110.

The wavelength conversion layer 130 includes a first wavelength conversion element WC1, a second wavelength conversion element WC2, and a bank BA. The first wavelength conversion element WC1 is spaced apart from the second wavelength conversion element WC2 and arranged side by side with the second wavelength conversion element WC2 in a direction parallel to the second main surface 112 of the first insulating substrate 110. The first wavelength conversion element WC1 is formed in an area corresponding to a first pixel PX1. The second wavelength conversion element WC2 is formed in an area corresponding to a third pixel PX3. A wavelength conversion element is not arranged in an area corresponding to the second pixel PX2. For example, the first wavelength conversion element WC1 converts blue light into green light and the second wavelength conversion element WC2 converts blue light into red light. For this reason, for example, if the backlight unit BL is a blue light source, the second pixel PX2 corresponds to a blue pixel displaying a blue color, the first pixel PX1 corresponds to a green pixel displaying a green color, and a third pixel PX3 corresponds to a red pixel displaying a red color. Each bank BA is formed between the wavelength conversion elements, and located at each pixel boundary. The banks BA are formed of, for example, a resin material. The banks BA may further have a light shielding property.

The first wavelength conversion element WC1 comprises a solid-state support SOL, and a first quantum rod QR1 which is a rod-shaped quantum dot dispersed in the solid-state support SOL. The second wavelength conversion element WC2 comprises a solid-state support SOL, and a second quantum rod QR2 which is a rod-shaped quantum dot dispersed in the solid-state support SOL. The solid-state support SOL is formed of, for example, a resin material such as a thermosetting resin or a photosetting resin. For example, a long axis of each of the first quantum rod QR1 and the second quantum rod QR2 is aligned in a direction parallel to the second main surface 112.

The quantum rod is a rod-shaped quantum dot, an outer shape of which has a long axis and a short axis. The length along the long axis and the short axis of the quantum rod ranges from several nanometers to several tens of nanometers. The quantum rod of the present embodiment is formed of, for example, a group-II-VI semiconductor or group-III-V semiconductor having a wurtzite or sphalerite crystalline structure. For example, a polar axis of such a quantum rod is a c axis or <111> axis and matches the long axis. The quantum rod is formed in, for example, a core-shell structure. The core is located at the center of the quantum rod and is formed of, for example, cadmium selenide (CdSe), cadmium telluride (CdTe), indium phosphide (InP) or the like. The shell covers the surrounding of the core to stabilize the core physically and chemically. The surrounding of the shell is often modified by an organic molecule. The shell is formed of, for example, zinc sulfide (ZnS), cadmium sulfide (CdS) or the like. The quantum rod has an emission wavelength selectivity in accordance with the type and size of the semiconductor of the core. Thus, a quantum rod having a preferable emission wavelength can be formed and arranged at each of the first wavelength conversion element WC1 and the second wavelength conversion element WC2.

The interlayer insulating film 140 is arranged between the wavelength conversion layer 130 and the liquid crystal layer LQ. In other words, the interlayer insulating film 140 is arranged between the first wavelength conversion element WC1 and the liquid crystal layer LQ, in an area corresponding to the first pixel PX1. In addition, the interlayer insulating film 140 is arranged between the second wavelength conversion element WC2 and the liquid crystal layer LQ, in an area corresponding to the third pixel PX3. The interlayer insulating film 140 is arranged between the first wavelength conversion element WC1 and the second wavelength conversion element WC2, in an area corresponding to the second pixel PX2. The interlayer insulating film 140 includes a first recess portion 101, in an area corresponding to the second pixel PX2. In other words, the first recess portion 101 is formed at a position different from the position opposed to the first wavelength conversion element WC1 and the second wavelength conversion element WC2. The interlayer insulating film 140 has a third main surface 143 opposed to the liquid crystal layer LQ. The second main surface 112 is closer to the third main surface 143 of the first recess portion 101 than to the third main surface 143 at the position opposed to the first wavelength conversion element WC1 and the second wavelength conversion element WC2. The interlayer insulating film 140 may have thickness different in the third direction Z, in the area corresponding to the first recess portion 101 and the area opposed to the first wavelength conversion element WC1 and the second wavelength conversion element WC2. The interlayer insulating film 140 is formed of, for example, a transparent resin material, but may be formed of a transparent inorganic material such as silicon nitride, silicon oxide or the like.

The first pixel electrode PE1, the second pixel electrode PE2 and the third pixel electrode PE3 are arranged between the first insulating substrate 110 and the second insulating substrate 210 or between the interlayer insulating film 140 and the liquid crystal layer LQ. In the example illustrated, the first pixel electrode PE1, the second pixel electrode PE2 and the third pixel electrode PE3 are arranged on the third main surface 143 of the interlayer insulating film 140. The first pixel electrode PE1 is arranged in the area corresponding to the first pixel PX1 and opposed to the first wavelength conversion element WC1. The second pixel electrode PE2 is arranged in the area corresponding to the second pixel PX2 and located at the first recess portion 101. The third pixel electrode PE3 is arranged in the area corresponding to the third pixel PX3 and opposed to the second wavelength conversion element WC2. Each of the first pixel electrode PE1 to the third pixel electrode PE3 is formed of, for example, a transparent, electrically conductive material such as indium tin oxide (ITO) or indium zinc oxide (IZO).

The first alignment film AL1 covers the third main surface 143, the first pixel electrode PE1, the second pixel electrode PE2, and the third pixel electrode PE3.

The second insulating film 210 is arranged to be opposed to the first insulating substrate 110. The second insulating substrate 210 is formed of an insulating material having a light transmissivity, similarly to the first insulating substrate 110. The second insulating substrate 210 includes a fourth main surface 214 opposed to the liquid crystal layer LQ and a fifth main surface 215 arranged on a side opposite to the fourth main surface 214.

The light-shielding layer BM is arranged on the fourth main surface 214 of the second insulating substrate 210. The light-shielding layer BM is located at each pixel boundary and opposed to the banks BA. The light-shielding layer BM is formed of a material absorbing the light. The light-shielding layer BM may not be arranged. In this case, the banks BA can functionally serve as the light-shielding layer BM.

The overcoat layer 220 covers the light-shielding layer BM and is arranged on the fourth main surface 214 of the second insulating substrate 210. The overcoat layer 220 is arranged in each of the area corresponding to the first pixel PX1 and the area corresponding to the third pixel PX3. In other words, the overcoat layer 220 is opposed to each of the first wavelength conversion element WC1 and the second wavelength conversion element WC2. The overcoat layer 220 includes a second recess portion 201, in the area corresponding to the second pixel PX2. In other words, the second recess portion 201 is opposed to the first recess portion 101 and formed at a position different from the position opposed to the first wavelength conversion element WC1 and the second wavelength conversion element WC2. It should be noted that the overcoat layer 220 may also be arranged in the area corresponding to the second pixel PX2. In this case, desirably, the overcoat layer 220 is formed to have the thickness different in the third direction Z, in each of the area corresponding to the first pixel PX1 and the area corresponding to the second pixel PX2. The overcoat layer 220 is formed of, for example, a transparent resin material.

In the present embodiment, at least one of the first recess portion 101 and the second recess portion 201 may be formed.

The second alignment film AL2 covers the overcoat layer 220. Each of the first alignment film AL1 and the second alignment film AL2 is formed of, for example, a resin material such as polyimide. The first alignment film AL1 and the second alignment film AL2 are subjected to alignment treatment as needed. Each of the first alignment film AL1 and the second alignment film AL2 is formed of a material having a preferable alignment property such as a horizontal alignment property or a vertical alignment property in accordance with the display mode of the liquid crystal.

The liquid crystal layer LQ is arranged between the first insulating substrate 110 and the second insulating substrate 210 and is in contact with the first alignment film AL1 and the second alignment film AL2. The liquid crystal layer LQ has first thickness D1 in the third direction Z, in the areas corresponding to the first pixel electrode PE1 and the third pixel electrode PE3. In addition, the liquid crystal layer LQ has second thickness D2 in the third direction Z, in the area corresponding to the second pixel electrode PE2. In the area corresponding to the second pixel electrode PE2, the second thickness D2 is greater than the first thickness D1 since the first recess portion 101 and the second recess portion 201 exist. The difference between the first thickness D1 and the second thickness D2 is controlled by the depth in the third direction Z of the first recess portion 101 and the second recess portion 201. For example, the second thickness D2 is approximately double the first thickness D1.

The first optical element OD1 is arranged on the first main surface 111 of the first insulating substrate 110 and located between the first insulating substrate 110 and the backlight unit BL. The first optical element OD1 comprises a first polarizer PL1. The second optical element OD2 is arranged on the fifth main surface 215 of the second insulating substrate 210. The second optical element OD2 comprises a second polarizer PL2. Each of the first optical element OD1 and the second optical element OD2 may further comprise various optical function layers such as a retardation film. Each of the first polarizer PL1 and the second polarizer PL2 may be configured to comprise, for example, a film-type polarizer obtained by dying a resin material such as polyvinyl alcohol or the like with iodine or pigment or a wire-grid polarizer obtained by arranging fine metal wires at regular pitches.

The backlight unit BL is provided on a side opposed to the first main surface 111 of the first insulating substrate 110. The type of backlight unit BL is not limited specifically. The backlight unit EL comprises, for example, a blue monochromatic light source. A light-emitting diode (LED), a semiconductor laser, or the like can be applied as the light source. It should be noted that the polarized light of the light emitted from the backlight unit BL is, for example, natural light but may be linearly polarized light or elliptically polarized light.

FIG. 4 is a view showing a cross-section of the display device comprising the wavelength conversion layer in the second substrate.

The example shown in FIG. 4 is different from the example shown in FIG. 3 with respect to the position of the wavelength conversion layer 130. The wavelength conversion layer 130 includes the second substrate 200. In the example illustrated, the wavelength conversion layer 130 is arranged on the fourth main surface 214 of the second insulating substrate 210. In other words, the first wavelength conversion element WC1 is located between the first pixel electrode 2E1 and the second insulating substrate 210, and the second wavelength conversion element WC2 is located between the third pixel electrode 2E3 and the second insulating substrate 210.

The interlayer insulating film 140 includes the first recess portion 101 in the area opposed to the second pixel electrode PE2. In the interlayer insulating film 140, the thickness in the third direction Z of the area opposed to the second pixel electrode PE2 is smaller than the thickness in the third direction Z of the areas opposed to the first pixel electrode PE1 and the third pixel electrode PE3.

The overcoat layer 220 is arranged on the side of the wavelength conversion layer 130, which is opposed to the liquid crystal layer LQ. In other words, the overcoat layer 220 is arranged between the first wavelength conversion element WC1 and the liquid crystal layer LQ, in the area corresponding to the first pixel PX1. In addition the overcoat layer 220 is arranged between the second wavelength conversion element WC2 and the liquid crystal layer LQ, in the area corresponding to the third pixel PX3. The overcoat layer 220 includes the second recess portion 201 in the area corresponding to the second pixel PX2. The second alignment film AL2 is arranged on the side opposed to the liquid crystal layer LQ of the overcoat layer 220.

In this example, too, at least one of the first recess portion 101 and the second recess portion 201 may be formed. Thus, the liquid crystal layer LQ has the first thickness D1 in the areas opposed to the first pixel electrode PE1 and the third pixel electrode PE3, and the second thickness D2 greater than the first thickness D1 in the area opposed to the second pixel electrode PE2.

Figure 5:
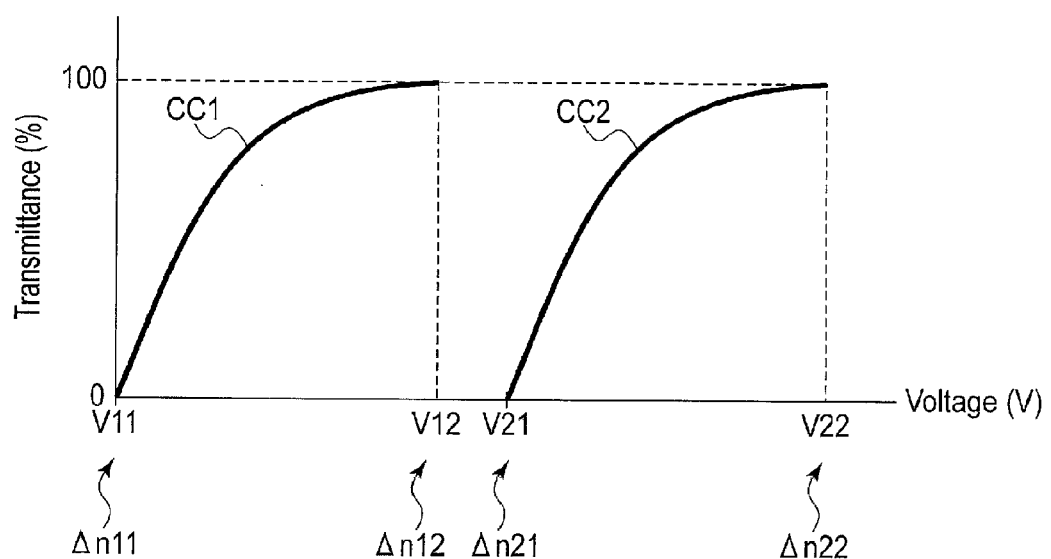
FIG. 5 is a graph presenting characteristic curves of a pixel transmittance to a voltage applied to a pixel electrode.

FIG. 5 is a graph presenting characteristic curves of a pixel transmittance to a voltage applied to a pixel electrode.

First characteristic curve CC1 is a graph representing an example of a transmittance to a voltage applied to the first pixel electrode PE1 in the first pixel PX1. Second characteristic curve CC2 is a graph representing an example of a transmittance to a voltage applied to the second pixel electrode PE2 in the second pixel PX2. The vertical axis indicates the transmittance, and the horizontal axis indicates the applied voltage. In the first characteristic curve CC1 and the second characteristic curve CC2, respectively, the maximum transmittance indicating white display is set at 100% while the minimum transmittance indicating black display is set at 0%. The "white display" corresponds to a state in which the color of each pixel is displayed, for example, a state in which a green color is displayed in the first pixel PX1, and a state in which a blue color is displayed in the second pixel PX2.

In the first characteristic curve CC1, the applied voltage at black display is a first black display voltage V11 while the applied voltage at white display is a first white display voltage V12 higher than the first black display voltage V11. In the second characteristic curve CC2, the applied voltage at black display is a second black display voltage V21 while the applied voltage at white display is a second white display voltage V22 higher than the second black display voltage V21. For example, the first black display voltage V11 is zero volt.

The first black display voltage V11 is different from the second black display voltage V21 with respect to the absolute value. The first white display voltage V12 is different from the second white display voltage V22 with respect to the absolute value. Furthermore, the absolute value of the second black display voltage V21 is larger than, for example, the absolute value of the first white display voltage V12, but may be smaller than the absolute value of the first white display voltage V12.

The liquid crystal layer LQ of the first pixel PX1 has a refractive anisotropy Δn11 to the light passing through the liquid crystal layer LQ, by an electric field formed between the first pixel electrode PE1 and the common electrode CE when the first black display voltage V11 is applied. Similarly, the liquid crystal layer LQ has a refractive anisotropy Δn12 to the light passing through the liquid crystal layer LQ, by an electric field formed between the first pixel electrode PE1 and the common electrode CE when the first white display voltage V12 is applied. The liquid crystal layer LQ of the second pixel PX2 has a refractive anisotropy Δn21 by an electric field formed between the second pixel electrode PE2 and the common electrode CE when the second black display voltage V21 is applied, and a refractive anisotropy Δn22 by an electric field formed between the second pixel electrode PE2 and the common electrode CE when the second white display voltage V22 is applied.

Figure 6A:
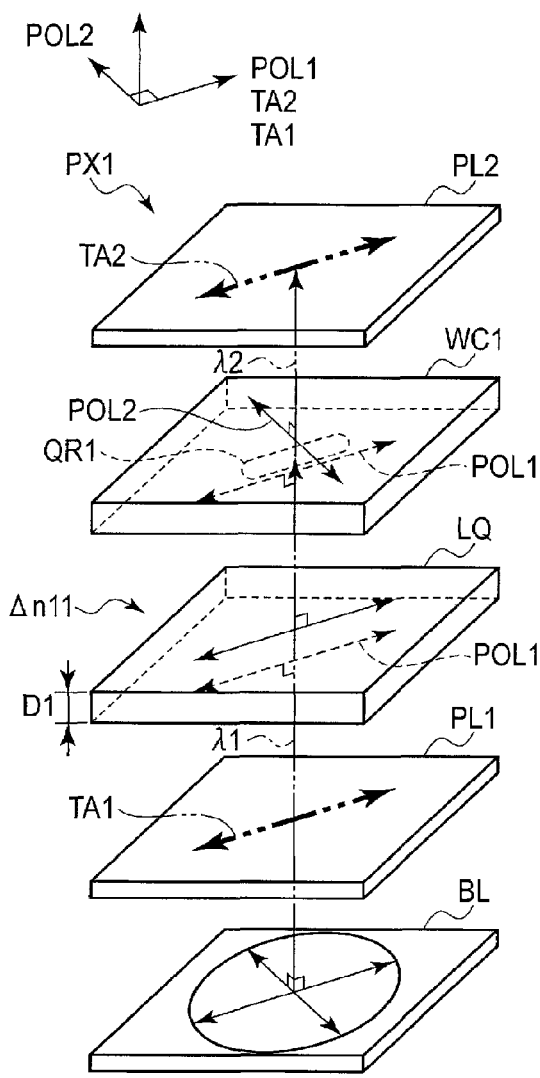
FIG. 6A is an illustration schematically showing a polarization direction of the light passing through the display device, in black display.

FIG. 6A is an illustration schematically showing a polarization direction of the light passing through the display device, in black display. FIG. 6A illustrates a polarization direction of the light in the area corresponding to the first pixel PX1.

First, a behavior of the light emitted from the backlight unit BL, in the first pixel PX1, will be explained with reference to FIG. 6A. The backlight unit BL emits, for example, natural light of a first wavelength λ1. After passing through first polarizer PL1 having first transparent axis TA1, the natural light becomes linearly polarized light which is polarized in first polarization direction POL1 parallel to the first transparent axis TA1.

Next, the linearly polarized light passes through the liquid crystal layer LQ having the refractive anisotropy Δn11. Since the liquid crystal layer LQ has the first thickness D1 in the first pixel PX1, retardation of the liquid crystal layer LQ can be represented by (Δn11×D1). If the refractive anisotropy Δn11 is zero, the polarization direction of the linearly polarized light passing through the liquid crystal layer LQ is not changed since the retardation (Δn11×D1) of the liquid crystal layer LQ is zero. In other words, the polarization direction of the linearly polarized light emitted from the liquid crystal layer LQ is maintained as the first polarization direction POL1.

Next, the linearly polarized light is made incident on the first wavelength conversion element WC1. The first wavelength conversion element WC1 converts the linearly polarized light of the first wavelength λ1 polarized in the first polarization direction POL1 into linearly polarized light of second wavelength λ2 polarized in second polarization direction POL2. More specifically, the first quantum rod QR1 provided in the first wavelength conversion element WC1 absorbs the linearly polarized light of the first wavelength 21 and emits the linearly polarized light of the second wavelength λ2 longer than the first wavelength λ1. The quantum rod has a function of emitting the linearly polarized light which is polarized in a specific direction. The first quantum rod QR1 of the present embodiment has a property that the polarization direction of the absorbed linearly polarized light is perpendicular to the polarization direction of the emitted linearly polarized light. In other words, the second polarization direction POL2 is perpendicular to the first polarization direction POL1. For example, the long axis of the first quantum rod QR1 is aligned parallel to the first transparent axis TA1.

Next, the linearly polarized light polarized in the second polarization direction POL2 is made incident on the second polarizer PL2. The second polarizer PL2 has the second transparent axis TA2 parallel to the first transparent axis TA1. Since the second polarization direction POL2 is perpendicular to the first transparent axis TA1 parallel to the first polarization direction POL1, the second polarization direction POL2 is also perpendicular to the second transparent axis TA2. The linearly polarized light polarized in the second polarization direction POL2 is therefore absorbed into the second polarizer PL2. In other words, the light emitted from the backlight unit BL in the first pixel PX1 is not emitted to the outside of the display device DSP. Thus, the first pixel PX1 becomes black display.

Figure 6B:
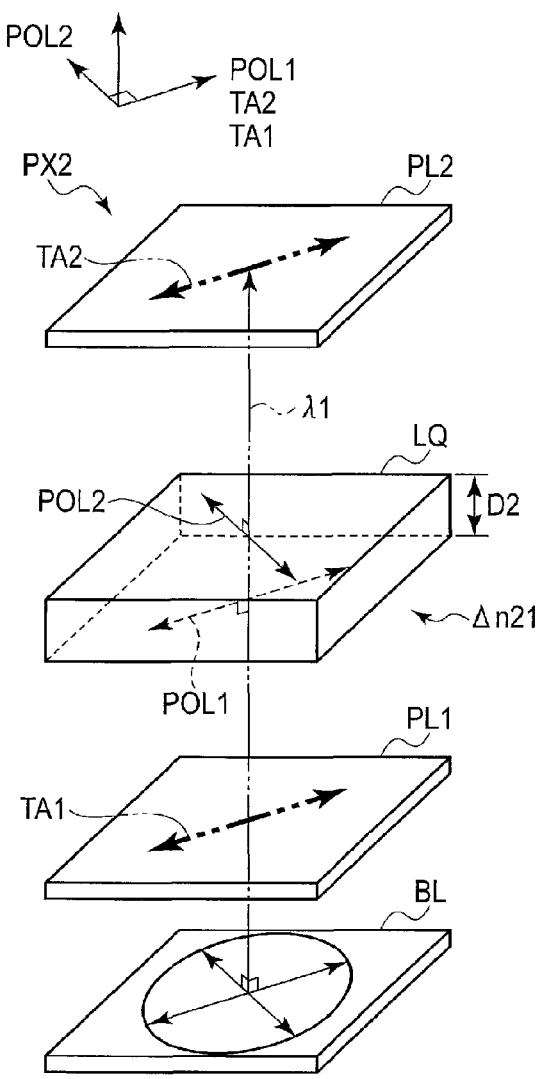
FIG. 6B is an illustration schematically showing a polarization direction of the light passing through the display device, in black display.

FIG. 6B is an illustration schematically showing a polarization direction of the light passing through the display device, in black display. FIG. 6B illustrates a polarization direction of the light in the area corresponding to the second pixel PX2.

Next, a behavior of the light emitted from the backlight unit BL, in the second pixel PX2, will be explained with reference to FIG. 6B. After passing through the first polarizer PL1 having the first transparent axis TA1, the natural light emitted from the backlight unit BL becomes linearly polarized light which is polarized in the first polarization direction POL1 parallel to the first transparent axis TA1.

Next, the linearly polarized light passes through the liquid crystal layer LQ having the refractive anisotropy Δn21. Since the liquid crystal layer LQ has the second thickness D2 in the second pixel PX2, the retardation of the liquid crystal layer LQ can be represented by (Δn21×D2). The linearly polarized light passing through the liquid crystal layer LQ is influenced by the retardation (Δn21×D2) of the liquid crystal layer LQ and its polarization direction is changed. At this time, if the retardation (Δn21×D2) is λ/2, the polarization direction of the linearly polarized light emitted from the liquid crystal layer LQ is perpendicular to the first polarization direction POL1 of the linearly polarized light incident on the liquid crystal layer LQ. In other words, the polarization direction of the linearly polarized light emitted from the liquid crystal layer LQ is parallel to the second polarization direction POL2 shown in FIG. 6A. Thus, in the second pixel PX2, too, the linearly polarized light emitted from the backlight unit BL is absorbed into the second polarizer PL2 having the second transparent axis TA2 and is not emitted to the outside of the display device DSP. In other words, the second pixel PX2 becomes black display.

FIG. 7A is an illustration schematically showing a polarization direction of the light passing through the display device, in white display. FIG. 7A illustrates a polarization direction of the light in the area corresponding to the first pixel PX1.

First, a behavior of the light emitted from the backlight BL, in the first pixel PX1, will be explained with reference to FIG. 7A. After passing through the first polarizer PL1 having the first transparent axis TA1, the natural light emitted from the backlight unit BL becomes linearly polarized light which is polarized in the direction parallel to the first transparent axis TA1.

Next, the linearly polarized light passes through the liquid crystal layer LQ having the refractive anisotropy Δn12. The retardation of the liquid crystal layer LQ in the first pixel PX1 can be represented by (Δn12×D1). The linearly polarized light passing through the liquid crystal layer LQ is influenced by the retardation (Δn12×D1) of the liquid crystal layer LQ and its polarization direction is changed. At this time, if the retardation (Δn12×D1) is λ/2, the polarization direction of the linearly polarized light emitted from the liquid crystal layer LQ is perpendicular to the polarization direction of the linearly polarized light incident on the liquid crystal layer LQ. In other words, the linearly polarized light emitted from the liquid crystal layer LQ is polarized in the direction perpendicular to the first transparent axis TA1. The polarization direction of the linearly polarized light emitted from the liquid crystal layer LQ is set as the first polarization direction POL1. In other words, the first polarization direction POL1 is perpendicular to the first transparent axis TA1.

Next, the linearly polarized light is made incident on the first wavelength conversion element WC1. The first quantum rod QR1 in the first wavelength conversion element WC1 absorbs the linearly polarized light of the first wavelength 21 polarized in the first polarization direction POL1 and emits the linearly polarized light of the second wavelength λ2 polarized in the second polarization direction POL2. The second polarization direction POL2 is perpendicular to the first polarization direction POL1. For example, the long axis of the first quantum rod QR1 is aligned parallel to the first transparent axis TA1.

Next, the linearly polarized light polarized in the second polarization direction POL2 is made incident on the second polarizer PL2. The second polarizer PL2 has the second transparent axis TA2 parallel to the first transparent axis TA1. The second polarization direction POL2 is perpendicular to the first polarization direction POL1, and the first polarization direction POL1 is perpendicular to the first transparent axis TA1. In other words, the second polarization direction POL2 is parallel to the first transparent axis TA1. The linearly polarized light emitted from the first wavelength conversion element WC1 transmits the second polarizer PL2. In other words, the light emitted from the backlight unit BL in the first pixel PX1 is emitted to the outside of the display device DSP and contributes to the display. Thus, the first pixel PX1 becomes white display (more exactly, green display).

Next, a behavior of the light emitted from the backlight unit BL, in the second pixel PX2, will be explained with reference to FIG. 7B.

FIG. 7B is an illustration schematically showing a polarization direction of the light passing through the display device, in white display. FIG. 7B illustrates a polarization direction of the light in the area corresponding to the second pixel PX2.

After transmitting the first polarizer PL1 having the first transparent axis TA1, the natural light emitted from the backlight unit BL becomes linearly polarized light which is polarized in the direction parallel to the first transparent axis TA1.

Next, the linearly polarized light passes through the liquid crystal layer LQ having the refractive anisotropy Δn22. The retardation of the liquid crystal layer LQ in the second pixel PX2 can be represented by (Δn22×D2). The linearly polarized light passing through the liquid crystal layer LQ is influenced by the retardation (Δn22×D2) of the liquid crystal layer LQ. At this time, if the retardation (Δn22×D2) is λ, the polarization direction of the linearly polarized light emitted from the liquid crystal layer LQ is parallel to the polarization direction of the linearly polarized light incident on the liquid crystal layer LQ. In other words, the polarization direction of the linearly polarized light emitted from the liquid crystal layer LQ is parallel to the second polarization direction POL2 shown in FIG. 7A. Thus, in the second pixel PX2, too, the linearly polarized light emitted from the backlight unit BL is not absorbed into the second polarizer PL2 having the second transparent axis TA2, but is emitted to the outside of the display device DSP and contributes to the display. Thus, the second pixel PX2 becomes white display (more exactly, blue display).

The light emitted from the backlight unit BL in the third pixel PX3 shows the same behavior as the behavior in the pixel PX1 shown in FIG. 6A and FIG. 7A, though not shown in FIGS. 6A, 6B, 7A and 7B. Unlike the first pixel PX1 comprising the first wavelength conversion element WC1, however, the third pixel PX3 comprises the second wavelength conversion element WC2. In other words, in the third pixel PX3, the linearly polarized light of the first wavelength λ1 polarized in the first polarization direction POL1 is subjected to wavelength conversion into linearly polarized light of third wavelength λ3 polarized in the second polarization direction POL2 by the second quantum rod QR2 provided in the second wavelength conversion element WC2. The first wavelength λ1 corresponds to, for example, a peak wavelength in the emission spectrum or a dominant wavelength in an XYZ color system. For example, the first wavelength 21 is a wavelength in a blue area ranging from 380 to 490 nm, the second wavelength λ2 is a wavelength in a green area ranging from 490 to 560 nm, and the third wavelength X3 is a wavelength in a red area ranging from 560 to 780 nm.

As explained above, the efficiency of use of the light emitted from the backlight unit BL can be improved since the color display is implemented by converting substantially monochromatic light emitted from the backlight unit BL into a desired wavelength by the wavelength conversion layer 130, according to the present embodiment, unlike the display device to which a color filter absorbing light other than light of a desired wavelength from multiwavelength white light. For this reason, the power consumption of the backlight unit BL can be reduced. In other words, the display device DSP of the present embodiment can reduce the power consumption.

In the first wavelength conversion element WC1, the polarization direction of the absorbed light is perpendicular to the polarization direction of the emitted light. The liquid crystal layer LQ has the second thickness D2 greater than the first thickness D1, in the area corresponding to the second pixel PX2. Furthermore, the absolute value of the second black display voltage V21 is different from the absolute value of the first black display voltage V11. The polarized state of the light in the first pixel PX1 can be thereby made to match the polarized state of the light in the second pixel PX2, without arranging, for example, the λ/2-retardation film in the area corresponding to the second pixel PX2. In other words, since the display device DSP does not require a step of arranging a retardation film in the area corresponding to the second pixel PX2, in the manufacturing process, increase in the manufacturing costs can be suppressed.

The present embodiment can therefore provide a display device capable of reducing the power consumption and suppressing the increase in the manufacturing costs.

In addition, the display device DSP comprises the first wavelength conversion element WC1 comprising a plurality of the first quantum rods QR1 aligned in the same direction. The quantum rod emits the light polarized in a specific direction. Thus, in the present embodiment, even if the first wavelength conversion element WC1 is arranged between the first polarizer PL1 and the liquid crystal layer LQ or between the second polarizer PL2 and the liquid crystal layer LQ, the display device DSP has no risk of raising a problem to change the white display and the black display. In other words, the present embodiment can increase the degree of freedom in designing the display device DSP. In addition, the emission wavelength can be controlled at an arbitrary value in a wavelength range longer than the absorption wavelength, by varying the shape and size of the first quantum rod QR1. The color displayed by the first pixel PX1 can be therefore adjusted arbitrarily, in the display device DSP.

The quantum rod used in the wavelength conversion element emits the light, for example, omnidirectionally. The quantum rod does not only absorb the light from the light source and emit the light to a side opposite to the light source, but also emits the light to light source side. Thus, if the user is located on a side opposite to the light source with respect to the quantum rod, the display device should desirably comprise a structure to make the light emitting to the light source side contribute to the display, in order to efficiently use the light emission of the quantum rod. Next, a specific embodiment will be explained.

Figure 8:
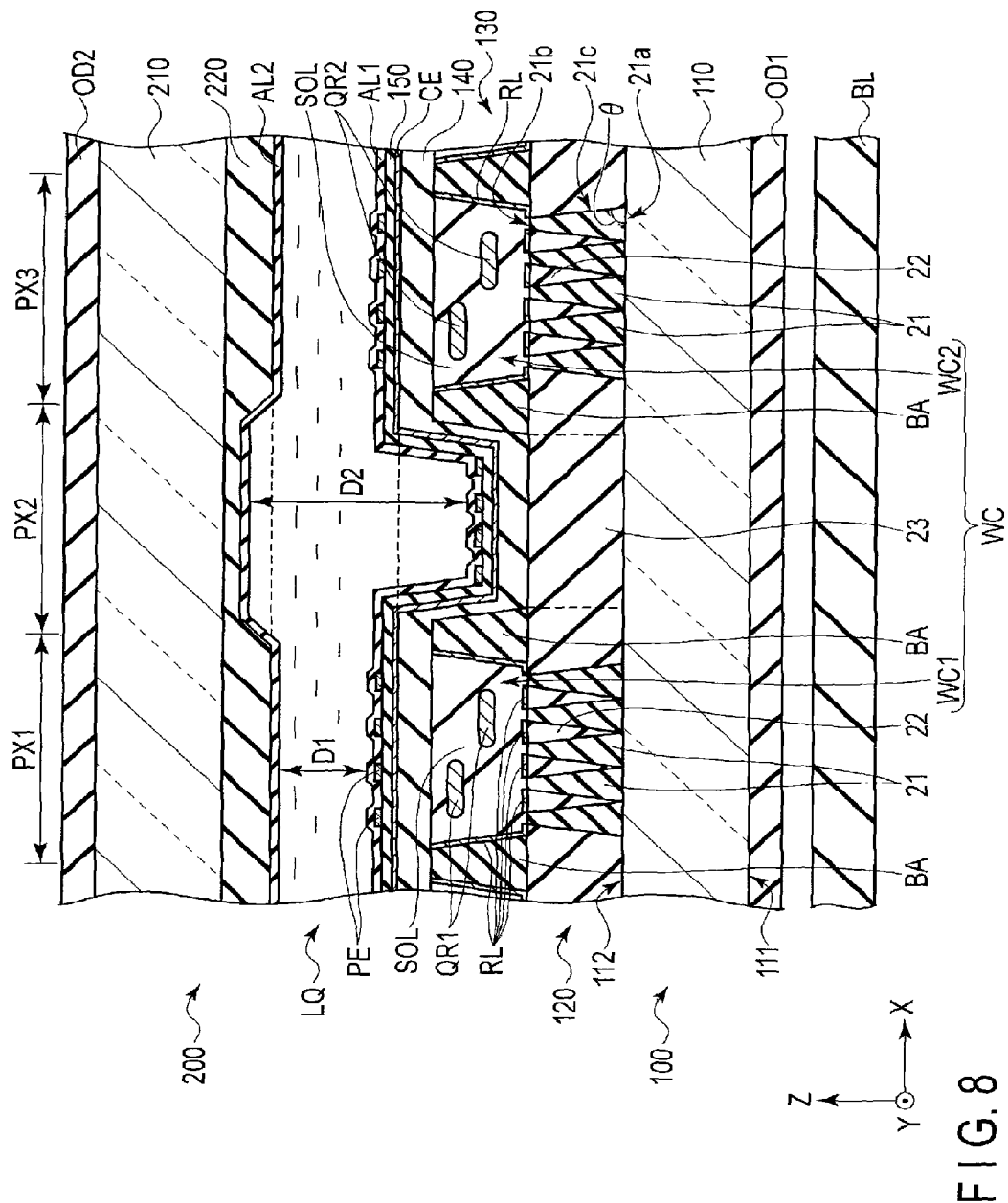
FIG. 8 is a view showing a cross-section of the display device comprising a light propagation layer.

FIG. 8 is a view showing a cross-section of the display device comprising a light propagation layer. Explanations of the constituent elements duplicating those shown in FIG. 3 or the same reference numbers and symbols as those in FIG. 3 will be omitted arbitrarily.

The first substrate 100 comprises a light propagation layer 120 and the wavelength conversion layer 130. The wavelength conversion layer 130 includes the wavelength conversion elements WC. The wavelength conversion elements WC include the first wavelength conversion element WC1 and the second wavelength conversion element WC2. The light propagation layer 120 and the wavelength conversion layer 130 arranged on a side opposed to the second main surface 112 of the first insulating substrate 110. In addition, the light propagation layer 120 is arranged between the first insulating substrate 110 and the wavelength conversion layer 130. The light propagation layer 120 comprises a first optical path portion 21, a non-optical path portion 22, and a second optical path portion 23. The first optical path portion 21 and the second optical path portion 23 penetrate the light propagation layer 120 in the third direction Z.

The first optical path portion 21 and the non-optical path portion 22 are arranged in the first pixel PX1 and the third pixel PX3, and are formed to be opposed to the first wavelength conversion element WC1 and the second wavelength conversion element WC2. The first optical path portion 21 comprises a bottom surface 21a opposed to the first insulating substrate 110, and an upper surface 21b opposed to the first wavelength conversion element WC1 and the second wavelength conversion element WC2. Furthermore, the first optical path portion 21 has a side surface 21c which links the bottom surface 21a and the upper surface 21b. The bottom surface 21a is in contact with the second main surface 112 of the first insulating substrate 110. The upper surface 21b is in contact with either the first wavelength conversion element WC1 or the second wavelength conversion element WC2. The area of the bottom surface 21a is larger than the area of the upper surface 21b. In the cross-section illustrated, the first optical path portion 21 is tapered such that the width in the first direction X becomes smaller from the second main surface 112 of the first insulating substrate 110 toward the wavelength conversion layer 130. In addition, in the example illuminated, a plurality of first optical path portions 21 are arranged in each pixel, and the first optical path portions 21 are arranged in the first direction X. At the first optical path portion 21, an angle θ made between the bottom surface 21a and the side surface 21c should desirably be set such that, for example, to totally reflect the light incident in the normal direction (i.e., the third direction Z) of the second main surface 112 on the side surface 21c, the angle of the light incident on the side surface 21c is larger than a critical angle. The first optical path portion 21 is formed of, for example, a high-refractive-index material such as transparent resin.

The non-optical path portions 22 are arranged to sandwich the first optical path portion 21. In the example illustrated, each of the non-optical path portions 22 is arranged between two of the first optical path portions 21. The non-optical path portion 22 is in contact with the side surface 21c of the first optical path portion 21, but is not in contact with the bottom portion 21a or the upper surface 21b. In addition, the non-optical path portions 22 are also formed between the banks BA and the first insulating substrate 110. In the cross-section illustrated, each of the non-optical path portions 22 is inversely tapered such that the width in the first direction X becomes greater from the second main surface 112 of the first insulating substrate 110 toward the wavelength conversion layer 130. The non-optical path portions 22 are formed of a low-refractive-index material such as transparent resin, which has a refractive index lower than that of the first optical path portion 21.

The second optical path portion 23 is arranged in the second pixel PX2. In the example illustrated, the second optical path portion 23 is formed sequentially with the non-optical path portions 22, but may be formed of the same material as the material of the first optical path portions 21.

A reflective film RL is formed between the non-optical path portions 22 and the first wavelength conversion element WC1 and between the non-optical path portions 22 and the second wavelength conversion element WC2. Furthermore, the reflective film RL is also formed between the banks BA and the first wavelength conversion element WC1 and between the banks BA and the second wavelength conversion element WC2.

The common electrode CE is formed on the side of the interlayer insulating film 140, which is opposed to the liquid crystal layer LQ. The common electrode CE is arranged over the first pixel PX1 to the third pixel PX3. The interlayer insulating film 150 is formed on the side of the common electrode CE, which is opposed to the liquid crystal layer LQ. The interlayer insulating film 150 is formed of, for example, an inorganic insulating material such as silicon nitride or silicon oxide. The first pixel electrode PE1, the second pixel electrode PE2 and the third pixel electrode PE3 are arranged between the interlayer insulating film 140 and the liquid crystal layer LQ, and are formed on the side of the interlayer insulating film 150, which is opposed to the liquid crystal layer LQ. The first alignment film AL1 is formed on the side of the interlayer insulating film 150, which is opposed to the liquid crystal layer LQ. In addition, the first alignment film AL1 covers the pixel electrodes PE1 to PE3.

The second substrate 200 comprises a second insulating substrate 210, an overcoat layer 220, and a second alignment film AL2. The overcoat layer 220 includes the second recess portion 201 in the area opposed to the first recess portion 101. The second alignment film AL2 is arranged on the side opposed to the liquid crystal layer LQ of the overcoat layer 220. In this example illustrated, too, at least one of the first recess portion 101 and the second recess portion 201 may be formed. At this time, the liquid crystal layer LQ has the first thickness D1 in the area opposed to the first pixel electrode PE1, and the second thickness D2 in the area opposed to the second pixel electrode PE2. In the area opposed to the second pixel electrode PE2, the second thickness D2 is greater than the first thickness D1 since at least one of the first recess portion 101 and the second recess portion 201 exists.

In this modified example, too, the same advantages as those of the above-explained example can be obtained. In addition, for example, a reflective film having a wavelength selectivity of transmitting light of a specific wavelength and reflecting or absorbing light of the other wavelengths, and the like are not interposed between the first optical path portions 21 of the light propagation layer 120 and the wavelength conversion layer 130. In other words, the light propagating the first optical path portions 21 is led into the wavelength conversion layer 130 without causing loss of reflection, absorption, or the like. In addition, since the area of the bottom surface 21a of the first optical path portion 21 located on the incident side (or the light source side) of the light propagation layer 120 is larger than the area of the upper surface 21b located on the emission side (or the wavelength conversion layer 130 side) of the light propagation layer 120, more light incident from the bottom surface 21a can be taken. In the present embodiment, therefore, when the light emitted from the external light source such as the backlight unit BL is made incident on the first substrate 100, the light can be led into the wavelength conversion layer 130 through the light propagation layer 120 with a high use efficiency. Moreover, the light incident on the first substrate 100 can be converted into the light of the other wavelengths with high use efficiency, in the wavelength conversion layer 130.

In addition, by making the incident angle of the light incident on the side surfaces 21c of the first optical path portions 21 greater than the critical angle, the light incident on the first optical path portions 21 along the direction of the normal line of the first main surface 110a is totally reflected on the side surfaces 21c. For this reason, the light incident on the first optical path portions 21 can be efficiently led into the wavelength conversion layer 130 without escaping to the non-optical path portions 22.

In addition, the area of installation of the reflective film RL formed between the non-optical path portions 22 and the wavelength conversion layer 130 can be made larger by reducing the area of the upper surface 21b of each first optical path portion 21. For this reason, the light converted by the wavelength conversion layer 130 can be reflected to the side opposite to the first insulating substrate 110 with a higher efficiency.

FIG. 9 is an illustration showing a structure of the reflective layer.

The reflective film RL is formed of a conductive material having a light reflectivity, such as silver, aluminum or other alloy. The reflective film RL may be, for example, a single-layer film of a metal material or a laminated film formed by stacking thin films of plural types of metal materials. The only reflective film RL arranged on a pixel PX is illustrated. The reflective film RL includes a first comb electrode RL1 comprising a plurality of first electrode portions E1, and a second comb electrode RL2 comprising a plurality of second electrode portions E2. The first electrode portions E1 extend in the second direction Y. The second electrode portions E2 extend in the second direction Y which is the same as the direction of extension of the first electrode portions E1. The first electrode portions E1 and the second electrode portions E2 are separated from each other and alternately arranged in the first direction X. The first electrode portions E1 and the second electrode portions E2 is formed in a stripe shape having a substantially equal width in the first direction X. The width of each of the first electrode portions E1 and the second electrode portions E2 is equal to the width in the first direction X, of the non-optical path portion 22 shown in FIG. 8. The first optical portion 21 is exposed between the first electrode portion E1 and the second electrode portion E2. In other words, the interval in the first direction X between the first electrode portion E1 and the second electrode portion E2 is equal to the width in the first direction X of the first optical path portion 21. A first electrode portion E11 located at the right end portion in the figure is formed to be wider than the other first electrode portions E1. A second electrode portion E21 located at the left end portion in the figure is formed to be wider than the other second electrode portions E2.

FIG. 10 is a view showing a method of forming a wavelength conversion element.

An example of the method of forming the wavelength conversion layer 130 will be hereinafter explained briefly with reference to FIG. 10. First, bank BA1 and bank BA2 are formed on a main surface 120a of the light propagation layer 120. After that, the first electrode portions E1 and the second electrode portions E2 of the reflective film EL are formed on the side surfaces of the bank BA1, the side surfaces of the bank BA2, and the area corresponding to the non-optical path portions 22 of the main surface 120a. At this time, in the example illustrated, the second electrode portions E21 are arranged on the side surfaces of the bank BA1, the first electrode portions E11 are arranged on the side surfaces of the bank BA2, and the other first electrode portions E1 and the second electrode portions E2 alternately arranged at positions overlapping the non-optical path portions 22 formed between the first electrode portions E11 and the second electrode portions E21. After that, a liquid liquid-phase support LIQ containing, for example, a raw material of photosetting resin or thermosetting resin is arranged in an area sectioned by the bank BA1 and the bank BA2. The quantum rod QR is dispersed in the liquid-phase support LIQ. Applicable examples of the method of arranging the liquid-phase support LIQ are, for example, an ink-jet method, a printing method and the like. After arranging the liquid-phase support LIQ, the voltage is applied to the first electrode portions E1 and the second electrode portions E2 to generate electric fields between the first electrode portions E1 and the second electrode portions E2 before curing them. The electric field formed between the first electrode portion E11 on the side surface of the bank BA2 and the second electrode portion E21 on the side surface of the bank BA1 is substantially parallel to the main surface 120a across the liquid-phase support LIQ. The electric field is formed so as to draw an arc between the first electrode portions E1 and the second electrode portions E2 formed in the area sectioned by the bank BA1 and the bank BA2. As shown in FIG. 9, since the first electrode portions E1 and the second electrode portions E2 are formed in a stripe shape extending in the second direction Y, the electric fields between the first electrode portions E1 and the second electrode portions E2 are formed along the approximately first direction X in the X-Y plane. For example, since the quantum rod QR has the polarity in the long-axis direction, the long axis of the quantum rod QR is aligned along the electric fields. In other words, the quantum rod QR is aligned such that the long axis is parallel to the main surface 120a, in the cross-sectional view of FIG. 10. In addition, the quantum rod QR is aligned such that the long axis is parallel to the direction of arrangement of the first electrode portions E1 and the second electrode portions E2, i.e., the first direction X, in the plan view of FIG. 9. After that, the liquid-phase support LIQ is cured in a state in which the quantum rod QR remains aligned. As a result, the liquid-phase support LIQ becomes the solid-phase support SOL, and the alignment of the quantum rod QR is fixed.

Thus, the reflective film RL includes the first electrode portions E1, and the second electrode portions E2 separated from the first electrode portions E1 and arranged alternately. For this reason, in the display device DSP, the quantum rod QR can be arranged in the state of being aligned in substantially the same direction, by applying the voltage to the reflective film RL, in the process of curing the liquid-phase support LIQ.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
a first insulating substrate;
a second insulating substrate opposed to the first insulating substrate;
a first pixel electrode and a second pixel electrode arranged between the first insulating substrate and the second insulating substrate;
a wavelength conversion element located between the first pixel electrode and the first insulating substrate or between the first pixel electrode and the second insulating substrate, to convert light of a first wavelength polarized in a first polarization direction into light of a second wavelength polarized in a second polarization direction; and
a liquid crystal layer located between the first insulating substrate and the second insulating substrate, having a first thickness in an area opposed to the first pixel electrode, and having a second thickness greater than the first thickness in an area opposed to the second pixel electrode,
wherein the second polarization direction is perpendicular to the first polarization direction.

2. The display device of claim 1, wherein
the wavelength conversion element comprises a rod-shaped quantum dot having a long axis aligned in a direction parallel to a main surface of the first insulating substrate or the second insulating substrate, and the quantum dot has a wavelength conversion property of absorbing the light of the first wavelength and emitting the light of the second wavelength longer than the first wavelength.

3. The display device of claim 1, wherein
a first black display voltage applied to the first pixel electrode when a first pixel in which the first pixel electrode is arranged is subjected to black display, is different in absolute value from a second black display voltage applied to the second pixel electrode when a second pixel in which the second pixel electrode is arranged is subjected to black display.

4. The display device of claim 3, wherein
a first white display voltage is applied to the first pixel electrode when the first pixel is subjected to white display, and
a second white display voltage different in absolute value from the first white display voltage is applied to the second pixel electrode when the second pixel is subjected to white display.

5. The display device of claim 1, wherein
the display device further comprises a backlight unit on a side opposite to a side of the first insulating substrate opposed to the second insulating substrate.

6. The display device of claim 5, wherein
the backlight unit is a monochromatic light source of the first wavelength, and
the first wavelength is a wavelength in a blue area.

7. The display device of claim 1, wherein
the display device further comprises an interlayer insulating film arranged on a side of the first insulating substrate opposed to the second insulating substrate, and
the interlayer insulating film includes a first recess portion at a position different from a position opposed to the wavelength conversion element.

8. The display device of claim 7, wherein the display device further comprises an overcoat layer arranged on a side of the second insulating substrate opposed to the first insulating substrate, and
the overcoat layer includes a second recess portion at a position different from a position opposed to the wavelength conversion element.

9. The display device of claim 1, wherein
the display device further comprises a reflective film arranged between the first insulating substrate and the wavelength conversion element.

10. The display device of claim 9, wherein
the reflective film includes a first electrode portion and a second electrode portion spaced apart from each other and arranged alternately, and
the wavelength conversion element comprises a rod-shaped quantum dot having a long axis aligned in a direction in which the first and second electrode portions are arranged.

11. A display device, comprising:
a first substrate;
a second substrate opposed to the first substrate; and
a liquid crystal layer arranged between the first substrate and the second substrate, the first substrate comprising:
an insulating substrate comprising a first main surface and a second main surface which is opposite to the first main surface;
a polarizer arranged on the first main surface;
a wavelength conversion element arranged on a side of the insulating substrate opposed to the second main surface;
an interlayer insulating film arranged at a position opposed to the wavelength conversion element, and including a first recess portion at a position different from the position opposed to the wavelength conversion element;
a first pixel electrode arranged between the interlayer insulating film and the liquid crystal layer, and opposed to the wavelength conversion element; and
a second pixel electrode arranged between the interlayer insulating film and the liquid crystal layer, and located at the first recess portion,
the liquid crystal layer having a first thickness in an area opposed to the first pixel electrode and a second thickness greater than the first thickness in an area opposed to the second pixel electrode.

12. The display device of claim 11, wherein
the second substrate comprises an overcoat layer arranged on a side opposed to the first substrate, and
the overcoat layer includes a second recess portion at a position opposed to the first recess portion.

13. The display device of claim 11, wherein the wavelength conversion element comprises a rod-shaped quantum dot having a long axis aligned in a direction parallel to a transparent axis of the polarizer, and the quantum dot absorbs light of a first wavelength polarized in the alignment direction of the long axis and emits light of a second wavelength polarized in a direction perpendicular to the alignment direction of the long axis.

14. The display device of claim 11, wherein a first black display voltage applied to the first pixel electrode when a first pixel in which the first pixel electrode is arranged is subjected to black display, is different in absolute value from a second black display voltage applied to the second pixel electrode when a second pixel in which the second pixel electrode is arranged is subjected to black display.

15. The display device of claim 14, wherein a first white display voltage is applied to the first pixel electrode when the first pixel is subjected to white display, and a second white display voltage different in absolute value from the first white display voltage is applied to the second pixel electrode when the second pixel is subjected to white display.

16. The display device of claim 11, wherein the display device further comprises a backlight unit on a side opposite to a side of the first substrate opposed to the second substrate.

17. The display device of claim 16, wherein the backlight unit is a monochromatic light source having a peak wavelength in a blue area.

18. The display device of claim 11, wherein the display device further comprises a reflective film arranged between the insulating substrate and the wavelength conversion element.

19. The display device of claim 18, wherein the reflective film includes a first electrode portion and a second electrode portion spaced apart from each other and arranged alternately, and the wavelength conversion element comprises a rod-shaped quantum dot having a long axis aligned in a direction in which the first electrode portion and the second electrode portion are arranged.

* * * * *